United States Patent
Katou et al.

(10) Patent No.: US 9,010,847 B2
(45) Date of Patent: Apr. 21, 2015

(54) VEHICLE BODY REAR STRUCTURE

(75) Inventors: Yasuyuki Katou, Wako (JP); Hirokuni Kumekawa, Wako (JP); Yasunori Takeda, Oyama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/236,172

(22) PCT Filed: May 17, 2012

(86) PCT No.: PCT/JP2012/062620
§ 371 (c)(1),
(2), (4) Date: Jan. 30, 2014

(87) PCT Pub. No.: WO2013/018417
PCT Pub. Date: Feb. 7, 2013

(65) Prior Publication Data
US 2014/0159428 A1   Jun. 12, 2014

(30) Foreign Application Priority Data

Aug. 2, 2011   (JP) ................................ 2011-169519

(51) Int. Cl.
*B60J 7/00* (2006.01)
*B62D 25/08* (2006.01)
*B62D 25/20* (2006.01)

(52) U.S. Cl.
CPC .............. *B62D 25/08* (2013.01); *B62D 25/087* (2013.01); *B62D 25/2027* (2013.01)

(58) Field of Classification Search
CPC .. G02B 6/4452; B62D 25/082; B62D 25/025; B62D 21/152; B62D 21/157; B62D 25/2036; B62D 25/087

USPC ............. 296/193.08, 203.02, 187.09, 193.04, 296/203.04
See application file for complete search history.

(56) References Cited

U.S. PATENT DOCUMENTS

| | | | | |
|---|---|---|---|---|
| 4,428,599 | A | * | 1/1984 | Jahnle ........................... 280/784 |
| 4,652,044 | A | * | 3/1987 | Harasaki ................... 296/203.04 |
| 4,682,812 | A | * | 7/1987 | Hurten et al. ............ 296/203.03 |
| 4,875,733 | A | * | 10/1989 | Chado et al. ............. 296/203.04 |
| 4,950,025 | A | * | 8/1990 | Yoshii ...................... 296/203.04 |
| 5,102,186 | A | * | 4/1992 | Yoshii et al. .............. 296/203.04 |
| 5,350,214 | A | * | 9/1994 | Yamauchi et al. ............ 296/204 |
| 5,388,885 | A | * | 2/1995 | Warren ..................... 296/203.03 |
| 5,788,322 | A | * | 8/1998 | Wolf et al. ................. 296/181.4 |

(Continued)

FOREIGN PATENT DOCUMENTS

| | | |
|---|---|---|
| JP | 2006-168456 | 6/2006 |
| JP | 2007-296879 | 11/2007 |
| JP | 2011-031648 | 2/2011 |

*Primary Examiner* — Kiran B Patel
(74) *Attorney, Agent, or Firm* — Rankin, Hill & Clark LLP (57) ABSTRACT

A vehicle body rear structure includes a left and right rear-side frame and a rear panel assembly. The left and right rear-side frames extend in the front-back direction of the vehicle body. The rear panel assembly forms a closed-cross-section section extending in the direction of vehicle width intersecting the rear-side frames, is provided to the back end of the rear-side frames, and configures the bottom of a vehicle body rear opening. The rear panel assembly is provided with a bulkhead that is disposed in the closed-cross-section section at the upper surface of the rear-side frames, and that partitions the interior of the closed-cross-section section with surfaces oriented in the direction of vehicle width.

6 Claims, 11 Drawing Sheets

(56) References Cited

U.S. PATENT DOCUMENTS

| | | | |
|---|---|---|---|
| 6,830,287 B1* | 12/2004 | Aghssa et al. | 296/187.11 |
| 6,846,037 B2* | 1/2005 | Engels et al. | 296/193.04 |
| 6,926,352 B2* | 8/2005 | Gotou et al. | 296/204 |
| 7,281,756 B2* | 10/2007 | Fukushi et al. | 296/203.04 |
| 7,628,446 B2* | 12/2009 | Harney et al. | 296/203.04 |
| 7,631,918 B2* | 12/2009 | Yasukouchi et al. | 296/30 |
| 7,866,738 B2* | 1/2011 | Andou et al. | 296/198 |
| 7,954,887 B2* | 6/2011 | Sakamoto et al. | 296/193.08 |
| 8,011,718 B2* | 9/2011 | Tsuyuzaki et al. | 296/203.04 |
| 8,556,336 B2* | 10/2013 | Yasuhara et al. | 296/193.07 |
| 8,888,157 B2* | 11/2014 | Narahara et al. | 296/1.08 |
| 2003/0071490 A1* | 4/2003 | Nishikawa et al. | 296/203.04 |
| 2003/0102696 A1* | 6/2003 | Matsuoka | 296/203.04 |
| 2004/0195865 A1* | 10/2004 | Tomita | 296/203.04 |
| 2006/0097533 A1* | 5/2006 | Watanabe et al. | 296/30 |
| 2013/0049394 A1* | 2/2013 | Urano et al. | 296/37.2 |

* cited by examiner

VEHICLE BODY REAR STRUCTURE

TECHNICAL FIELD

The present invention relates to a vehicle body rear structure where a rear wall defining a baggage room of a vehicle is formed in a closed-sectional shape.

BACKGROUND ART

Among the conventionally-known vehicle body rear structures are ones where an opening section (rear-vehicle-body opening section) through which to load baggage into a baggage compartment is formed in a rear vehicle body section and where a rear cross member constituting a part of the rear-vehicle-body opening section is disposed at a low position to facilitate loading and unloading of baggage.

In such a rear vehicle body section, the rear cross member is formed in a closed-sectional shape and joined at left and right ends to rear frames extending in a forward direction of the vehicle. Further, gussets are fixed to lower surface portions of the rear cross member located beneath the rear frames and the lower surfaces of the rear frames, and bulkheads are provided within the interior of the rear cross member, so that the rear vehicle body section can have an increased strength (see, for example, Patent Literature 1).

With the rear vehicle body section rear disclosed in Patent Literature 1, however, when an impact (load) has been input to a rear bumper beam extending along the rear cross member at the time of a read-end collision of the vehicle, the rear cross member and the bulkheads would undesirably deform. Namely, the rear bumper beam is supported by impact absorbing members provided between the rear cross member and the rear bumper beam so that the impact (load) can be absorbed by the impact absorbing members to prevent deformation of the rear cross member and the rear frames. Further, in the rear vehicle body section disclosed in Patent Literature 1, component parts required to be replaced due to the deformation can be limited only to component parts for transmitting the impact (load) to the impact absorbing members, and thus, necessary cost for the component part replacement can be minimized. However, if a greater impact (load) has been input at the time of a rear-end collision of the vehicle, it would transmit via the impact absorbing members to the rear cross member and the bulkhead, so that the rear cross member in the rear-vehicle-body opening section would deform. Therefore, there arises a need to replace the rear cross member and the bulkhead as well, which can undesirably increase the necessary cost of component part replacement following the rear-end collision.

Further, in the rear vehicle body section disclosed in Patent Literature 1, the gussets are provided on the lower surfaces of the rear frames. If the rear cross member is mounted above the rear frames conversely to the aforementioned, then the gussets can be fixed to the upper surfaces of the rear frames and the rear cross member, so that the rear vehicle body section can have an increased strength similarly to the aforementioned. However, if the gussets are fixed to the upper surfaces of the rear frames, the capacity of the baggage compartment would decrease because interior members provided along the gussets project considerably into the baggage compartment.

PRIOR ART LITERATURE

Patent Literature 1: Japanese Patent Application Laid-Open Publication No. 2006-168456

SUMMARY OF INVENTION

Technical Problem

It is therefore an object to provide an improved vehicle body rear structure which can not only increase rigidity and strength of the rear-vehicle-body opening section but also minimize the necessary cost of component part replacement following a rear-end collision of the vehicle.

Solution to Problem

According to claim 1, there is provided a vehicle body rear structure, which comprises: left and right side frames extending in a front-rear direction of a vehicle body; and a rear panel assembly defining a closed-sectional portion extending in a vehicle width direction to intersect with the left and right side frames, the rear panel assembly being joined to respective rear end portions of the left and right rear side frames to thereby define a lower part of a rear-vehicle-body opening section, the rear panel assembly including bulkheads each disposed on the upper surface of a corresponding one of the left and right rear side frames and within the interior of the closed-sectional portion and partitioning the interior of the closed-sectional portion with opposite surfaces of the bulkhead oriented in the vehicle width direction, the bulkhead being disposed in vertically superposed relation to the corresponding side frame.

Preferably, as recited in claim 2, the vehicle body rear structure of the present invention further comprises a rear bumper beam supported by the rear end portions of the left and right rear side frames and extending in the vehicle width direction, and the rear bumper beam is joined to the rear end portions via impact absorbing members.

Preferably, as recited in claim 3, each of the rear side frames has a flange plate provided on the edge of the rear end portion and has opposite surfaces orientated in the front-rear direction, the rear panel assembly includes an inner rear panel and an outer rear panel, the inner rear panel having an inner extension reaching the edge of the rear side frame and having opposite surfaces oriented in the front-rear direction of the vehicle body, each of the bulkheads having a bulkhead extension extending along the inner extension and having opposite surfaces oriented in the front-rear direction, the bulkhead being joined to the edge of the corresponding rear side frame by the inner extension being joined to the flange plate in superposed relation to the flange plate and the bulkhead extension being joined to the inner extension in superposed relation to the inner extension.

Preferably, as recited in claim 4, the rear-vehicle-body opening section has an opening-peripheral-edge layered flange extending in the vehicle width direction, and the opening-peripheral-edge layered flange comprises an inner peripheral-edge flange of the inner rear panel and an outer peripheral-edge flange of the outer rear panel superposed on the inner peripheral-edge flange. The bulkhead includes, on an upper portion thereof, a bulkhead-peripheral-edge flange sandwiched between and joined to the inner peripheral-edge flange and the outer peripheral-edge flange.

Preferably, as recited in claim 5, the inner rear panel includes: a lower plate section superposed on the upper surface of the rear side frame; a front plate section projecting upward integrally from the front edge of the lower plate section; an upper end section extending integrally from the upper edge of the front plate section in opposed relation to the lower plate section; and the inner extension extending integrally from the rear edge of the lower plate section. Each of the bulkheads includes: a bulkhead body section having the rear bulkhead wall extending integrally from the bulkhead extension upward beyond the rear side frame, one bulkhead side wall extending integrally from one vertical edge of the rear bulkhead wall toward the front plate section and another bulkhead side wall extending integrally from the other vertical edge of the rear bulkhead wall toward the front plate section; bulkhead-side-wall upper flanges bent from respective upper portions of the one and other bulkhead side walls to be superposed on the upper end section of the inner rear panel; bulkhead-side-wall front flanges bent from respective front portions of the one and other bulkhead side walls to be superposed on the front plate section; and bulkhead-side-wall corner flanges bent from the one and other bulkhead side walls to extend from the bulkhead-side-wall front flanges to the bulkhead-side-wall upper flanges.

Advantageous Effects of Invention

In the invention of claim 1, the rear panel assembly includes the bulkheads each disposed on the upper surface of the corresponding, i.e. left or right, rear side frame and within the interior of the closed-sectional portion and partitioning the interior of the closed-sectional portion with opposite surfaces of the bulkhead oriented in the vehicle width direction, and each of the bulkheads is disposed in vertically superposed relation to the corresponding rear side frame. With such arrangements, a load can be transmitted from the rear side frames to the rear panel assembly or from the rear panel assembly to the rear side frames via the bulkheads provided within the closed-sectional portion, with the result that rigidity and strength of the rear-vehicle-body opening section can be significantly increased.

Further, a load produced due to a rear-end collision of the vehicle can be input to a rear bumper beam disposed rearwardly of the rear panel assembly provided on a rear end portion of the structure. Consequently, the input load is transmitted directly to the rear side frames, not by way of the rear panel assembly and bulkheads, the present invention can minimize unwanted deformation of the rear panel assembly and bulkheads and thus minimize necessary cost for replacing component parts following the rear-end collision.

Further, in the invention of claim 2, the rear bumper beam is joined to the rear end portions of the rear side frames via the impact absorbing members. Thus, when a load has been input to the rear bumper beam at the time of a rear-end collision of the vehicle, the collision load can be transmitted to the rear side frames via the impact absorbing members (extensions). Therefore, the present invention can achieve increased collision resistance at the time of the rear-end collision. More specifically, the present invention can transmit the collision load to the rear side frames with an increased efficiency, for example, as compared to a case where the impact load is transmitted via a rear end cross member fixed to the distal end surfaces of the rear end portions and bulkheads (bumper mounting members) fixed to the rear end cross member. Namely, because the rear side frames are framework members of the vehicle body and have a high strength, the present invention can achieve increased collision resistance at the time of the rear-end collision by means of the high-strength rear side frames directly receiving the collision load.

In addition, because the rear side frames appropriately receive the collision load, the present invention can achieve a sufficient impact absorbing performance by allowing the impact absorbing members (extensions) to reliably deform to thereby absorb the collision impact.

Further, in the invention of claim 3, each of the rear side frames has the flange plate provided on the rear end portion, the inner rear panel of the rear panel assembly has the inner extension reaching the edge of the rear side frame and having its opposite surfaces oriented in the front-rear direction, each of the bulkheads has the bulkhead extension extending along the inner extension and having its opposite surfaces oriented in the front-rear direction, and the bulkhead is joined to the edge of the rear side frame by the inner extension being joined to the flange plate in superposed relation to the flange plate and the bulkhead extension being joined to the inner extension in superposed relation to the inner extension. Thus, when an upward load that may detach the bulkhead from the rear side frame has been input, the load would be applied as a shearing load to a joint section where the inner extension is joined to the flange plate and a joint section where the bulkhead extension is joined to the inner extension. In the present invention, a load produced between the rear side frame and the bulkhead extension can be received not only as a load in a detaching direction but also as a load in a shearing direction. As a result, the present invention can increase a joining strength between each of the rear side frames and the bulkheads and thereby increase the rigidity and strength of the rear-vehicle-body opening section.

Further, in the invention of claim 4, the rear-vehicle-body opening section has the opening-peripheral-edge layered flange extending in the vehicle width direction, and the opening-peripheral-edge layered flange comprises the inner peripheral-edge flange of the inner rear panel and the outer peripheral-edge flange of the outer rear panel superposed on the inner peripheral-edge flange. Each of the bulkhead includes, on its upper portion, the bulkhead-peripheral-edge flange sandwiched between and joined to the inner peripheral-edge flange and the outer peripheral-edge flange. With such arrangements, a vertical load, transmitted from the rear side frame, can be dispersed from the bulkhead-peripheral-edge flange of the bulkhead to the bulkhead-peripheral-edge flange, with the result that the rear-vehicle-body opening section can have an even further increased strength against a load from the rear side frame.

Furthermore, in the invention of claim 5, the inner rear panel includes: the lower plate section superposed on the upper surface of the rear side frame; the front plate section; the upper end section; and the inner extension. Each of the bulkheads includes: the bulkhead body section having the rear bulkhead wall, the one bulkhead side wall extending toward the front plate section and the other bulkhead side wall; the bulkhead-side-wall upper flanges bent from the respective upper portions of the one and other bulkhead side walls to be superposed on the upper end section of the inner rear panel; the bulkhead-side-wall front flanges bent from the respective front portions of the one and other bulkhead side walls to be superposed on the front plate section; and the bulkhead-side-wall corner flanges bent from the one and other bulkhead side walls to extend from the bulkhead-side-wall front flanges to the bulkhead-side-wall upper flanges. With such arrangements, a load can be dispersed by the bulkhead-side-wall corner flanges even in a corner portion, so that the bulkhead can itself have an increased rigidity and strength. Namely, the opposite surfaces of the bulkhead-side-wall upper flanges and the opposite surfaces of the bulkhead-side-wall front flanges are oriented in different directions; that is, the opposite surfaces of the bulkhead-side-wall upper flanges are oriented in a vertical (up-down) direction of the vehicle, while the opposite surfaces of the bulkhead-side-wall front flanges are oriented in the front-rear direction of the vehicle. Thus, corner portions between the bulkhead-sidewall front flanges and the bulkhead-side-wall upper flanges are partly cut for better formability at the time of plastic working. However, according to the present invention, the bulkhead-side-wall corner flanges are formed continuously with uncut regions of the corner portions within such a range that the formability is not adversely influenced. In this way, front ridge line portions defined by the bulkhead side walls and the bulkhead-side-wall front flanges can be formed continuously or integrally with upper ridge line portions defined by the bulkhead side walls and the bulkhead-side-wall upper flanges, so that the bulkhead can itself have an increased rigidity and strength.

DESCRIPTION OF EMBODIMENTS

Embodiment

Figure 1:
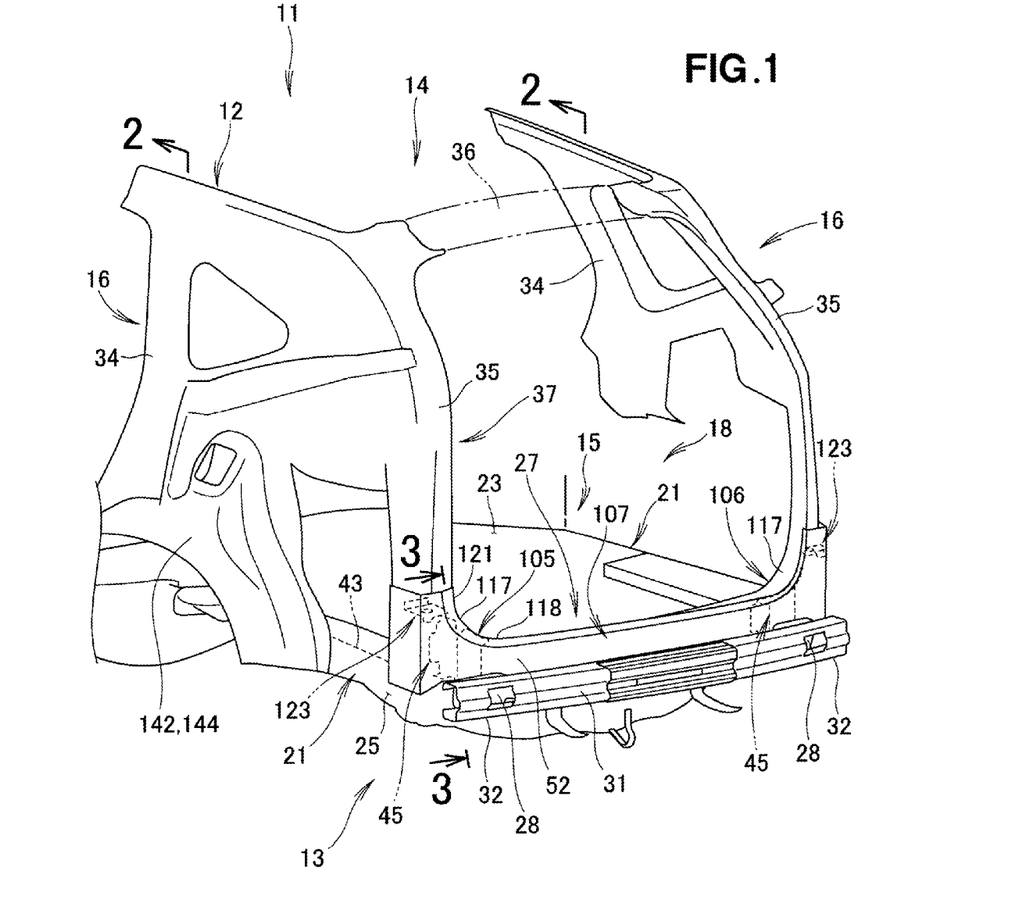
FIG. 1 is a perspective view of a vehicle provided with an embodiment of a vehicle body rear structure of the present invention.
Figure 2:
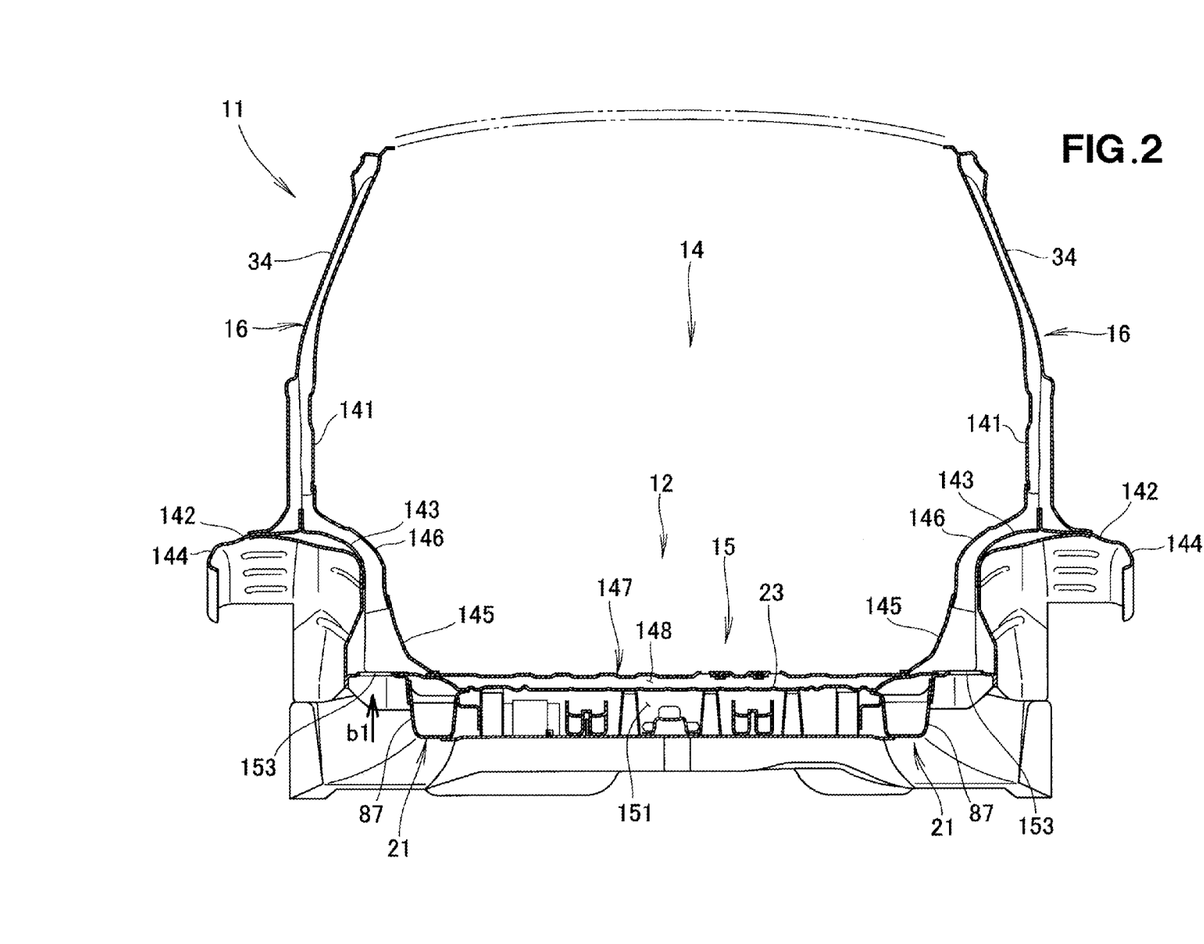
FIG. 2 is a sectional view taken along line 2-2 of FIG. 1.

Referring first to FIGS. 1 and 2, a vehicle 11 includes an embodiment of a rear vehicle body section 13 mounted on a vehicle body. The vehicle body 12 includes an underbody 15 constituting a floor of a passenger compartment 14, and left and right side bodies 16 constituting side walls of the passenger compartment 14. A baggage compartment 18 comprises the underbody 15 and the side bodies 16.

As shown in FIGS. 1 to 7, the underbody 15 includes left and right rear side frames 21 disposed on left and right sides of the vehicle body and extending in a front-rear direction of the vehicle body, and a rear floor panel 23. The underbody 15 further includes a rear panel assembly 27 extending in a vehicle width direction to be joined to respective rear end portions 25 of the corresponding, left and right, rear side frames 21 and extending in an upward direction of the vehicle.

Figure 4:
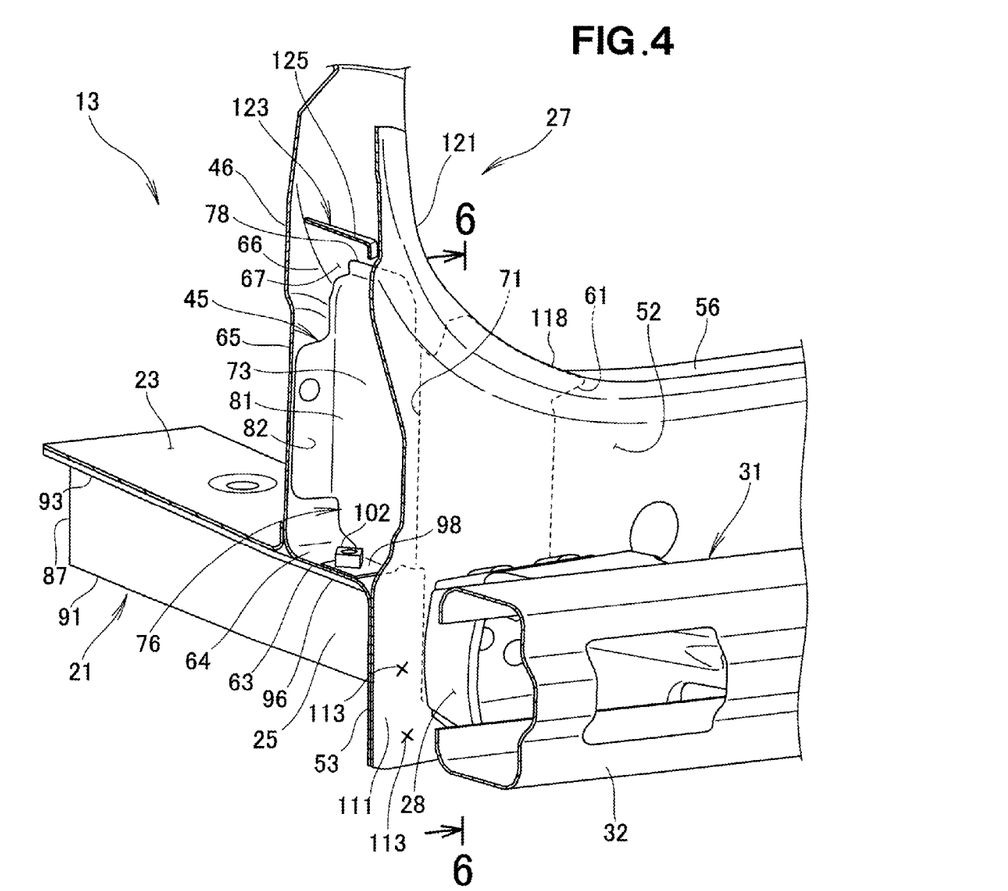
FIG. 4 is a perspective view of a rear vehicle body section shown in FIG. 3.

A rear bumper beam 31 is connected at its opposite end portions 32 to the rear end portions 25 of the left and right rear side frames 21 via impact absorbing members 28.

Each of the left and right side bodies 16 includes a left or right quarter pillar 34 and a left or right rear pillar 35 connecting to the left or right quarter pillar 34. A rear-vehicle-body opening section (i.e., tailgate opening section) 37 is defined by the left and right rear pillars 35, the rear panel assembly 27 and a rear roof rail 36. The rear panel assembly 27 of the rear vehicle body section 13 defines a lower part of the rear-vehicle-body opening section 37.

Now, with reference to FIGS. 1 to 12, a description will be given about a construction of the rear vehicle body section 13. The rear vehicle body section 13 includes; the left and right rear side frames 21 extending in the front-rear direction of the vehicle body 12; and the rear panel assembly 27 defining a closed-sectional portion (hollow portion) 41 (FIG. 6) that extends in the vehicle width direction to perpendicularly intersect with the left and right rear side frames 21 and interconnecting the rear end portions 25 of the left and right rear side frames 21 to thereby define the lower part of the rear-vehicle-body opening section 37 (FIG. 1).

The rear panel assembly 27 includes bulkheads 45 each provided on the upper surface 43 (FIG. 5) of the rear end portion 25 of the corresponding rear side frame 21 and located within the interior of the closed-sectional portion 41 with opposite surfaces thereof oriented in the vehicle width direction and thereby partitioning the interior of the closed-sectional portion 41.

Figure 5:
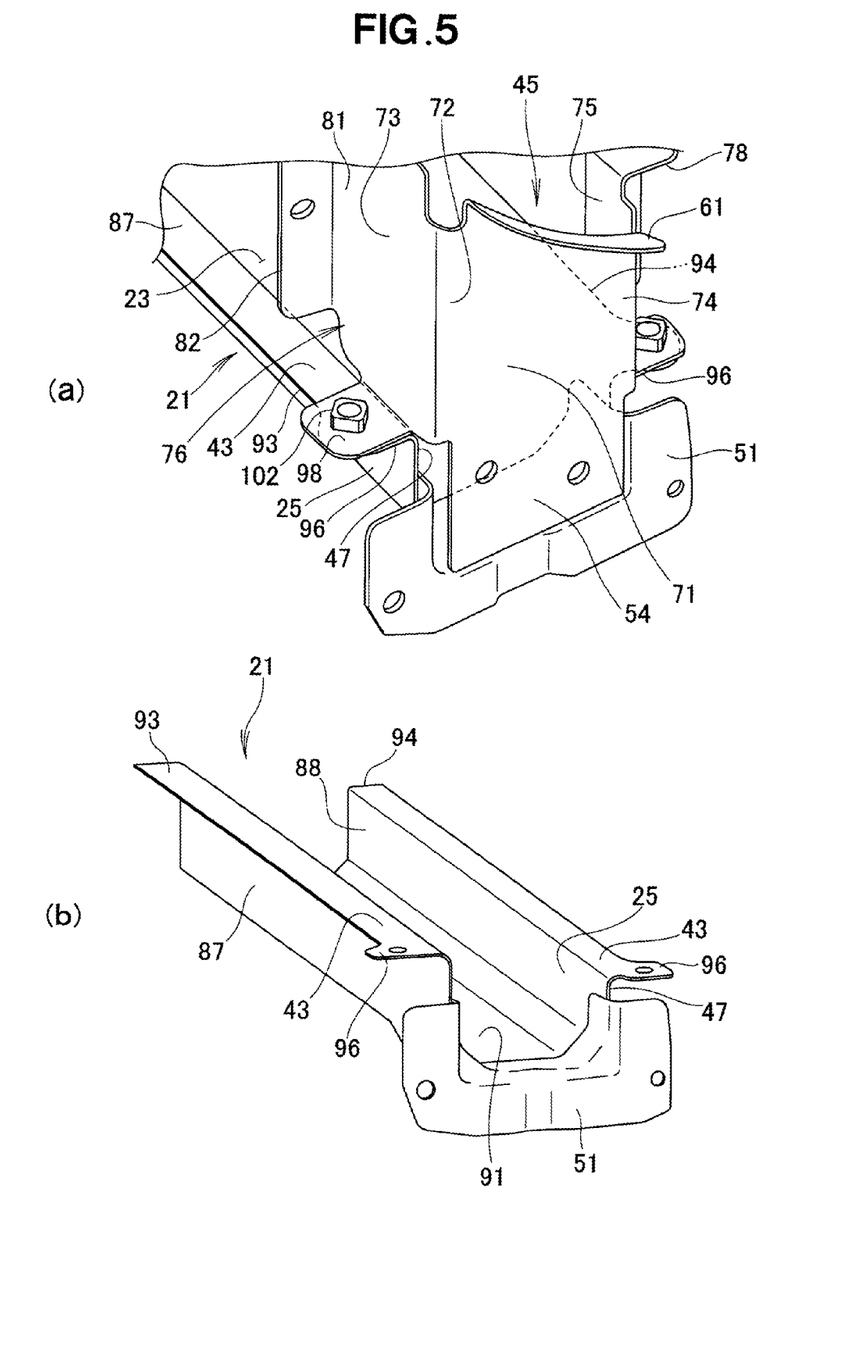
FIG. 5 is a perspective view showing mounting relationship between a rear side frame and a bulkhead.
Figure 10:
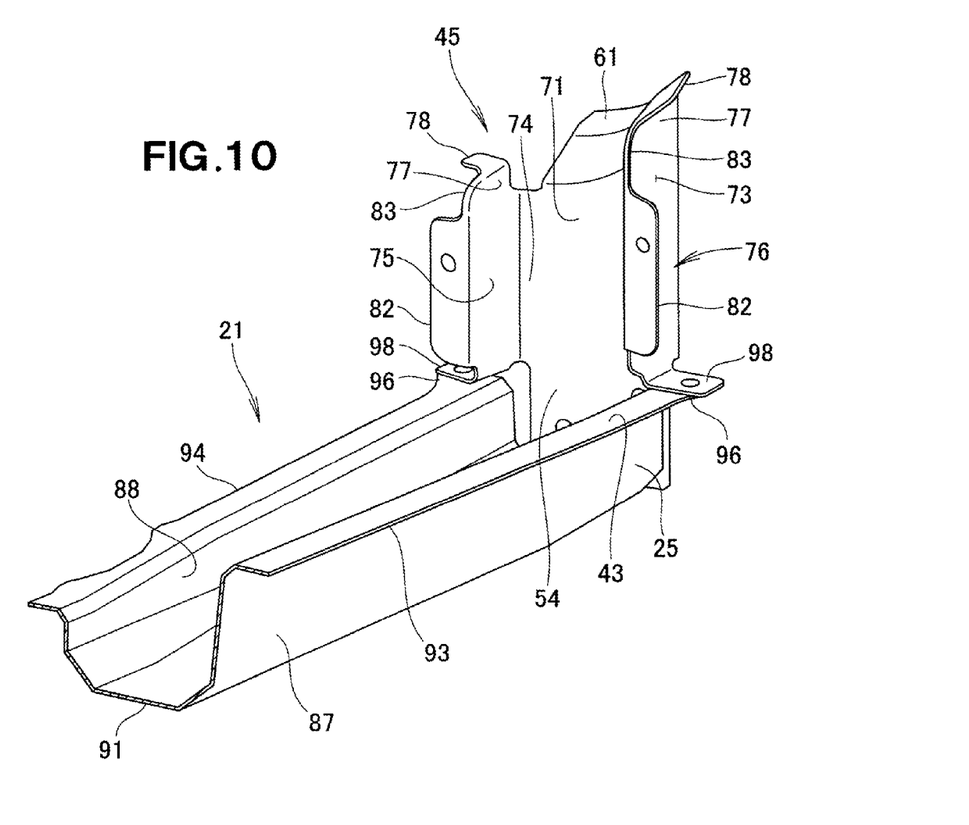
FIG. 10 is a perspective view showing mounting relationship between the rear side frame and the bulkhead.

The "upper surface 43 of the rear side frame 21" may also be construed means the upper surface of an inner rear panel 46 because the bulkhead 45 is provided on the upper surface 43 via the inner rear panel 46. The bulkhead 45 is disposed on the rear side frame 21 in vertically superposed relation to the latter (FIGS. 4, 5 and 10).

Further, as shown in FIGS. 1 and 4, the rear bumper beam 31 extending in the vehicle width direction is supported by the rear end portions 25 of the rear side frames 21. The rear bumper beam 31 is joined to the rear end portions 25 of the rear side frames 21 via the impact absorbing members 28.

Figure 3:
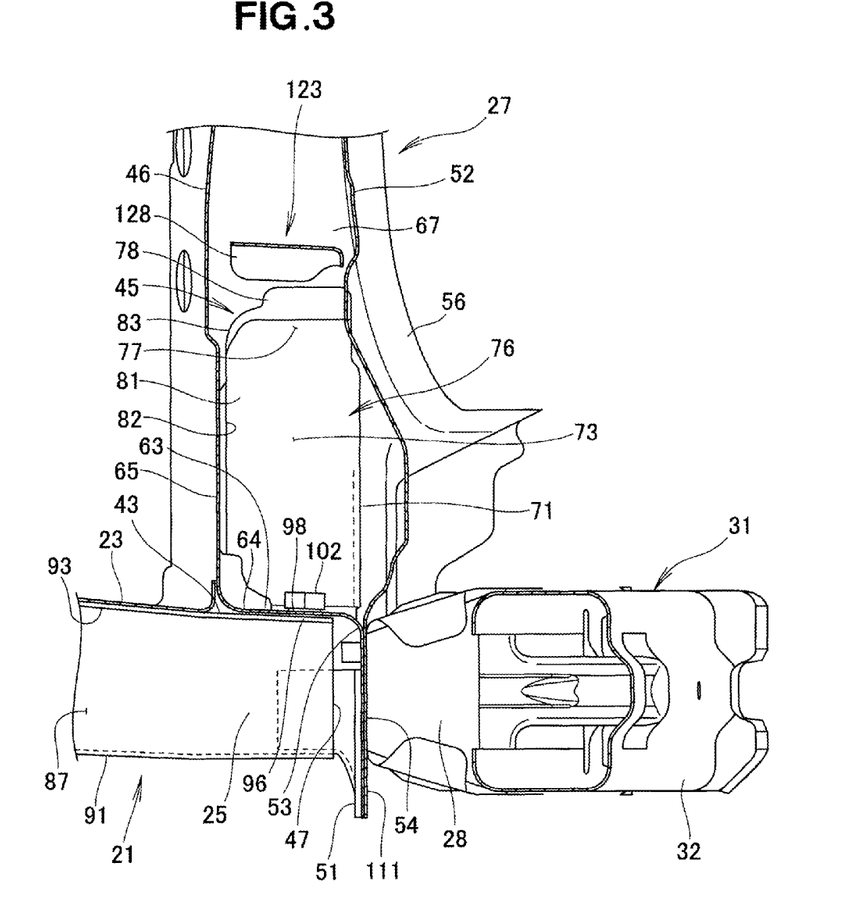
FIG. 3 is a sectional view taken along line 3-3 of FIG. 1.
Figure 6:
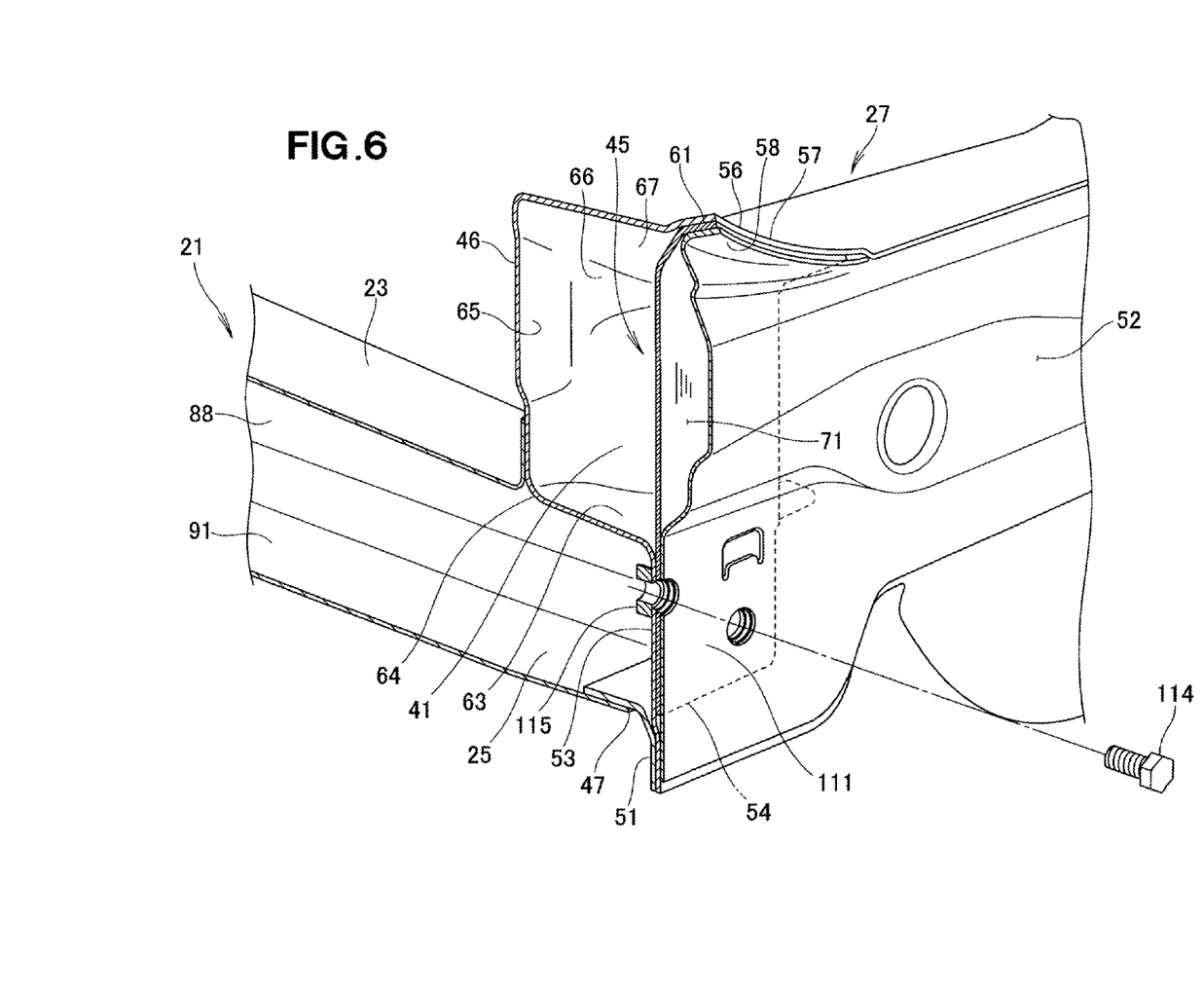
FIG. 6 is a sectional view taken along line 6-6 of FIG. 4.

Further, as shown in FIGS. 3, 4 and 6, each of the rear side frames 21 has a flange plate 51 provided on the edge 47 of the rear end portion 25 in such a manner that its opposite surfaces are oriented in the front-rear direction of the vehicle body. The rear panel assembly 27 includes the inner rear panel 46 and an outer rear panel 52.

The inner rear panel 46 includes an inner extension 53 reaching the edge 47 of the rear side frame 21 and having opposite surfaces orientated in the front-rear direction. The bulkhead 45 has a bulkhead extension 54 having opposite surfaces oriented in the front-rear direction and extending along the inner extension 53.

Figure 8:
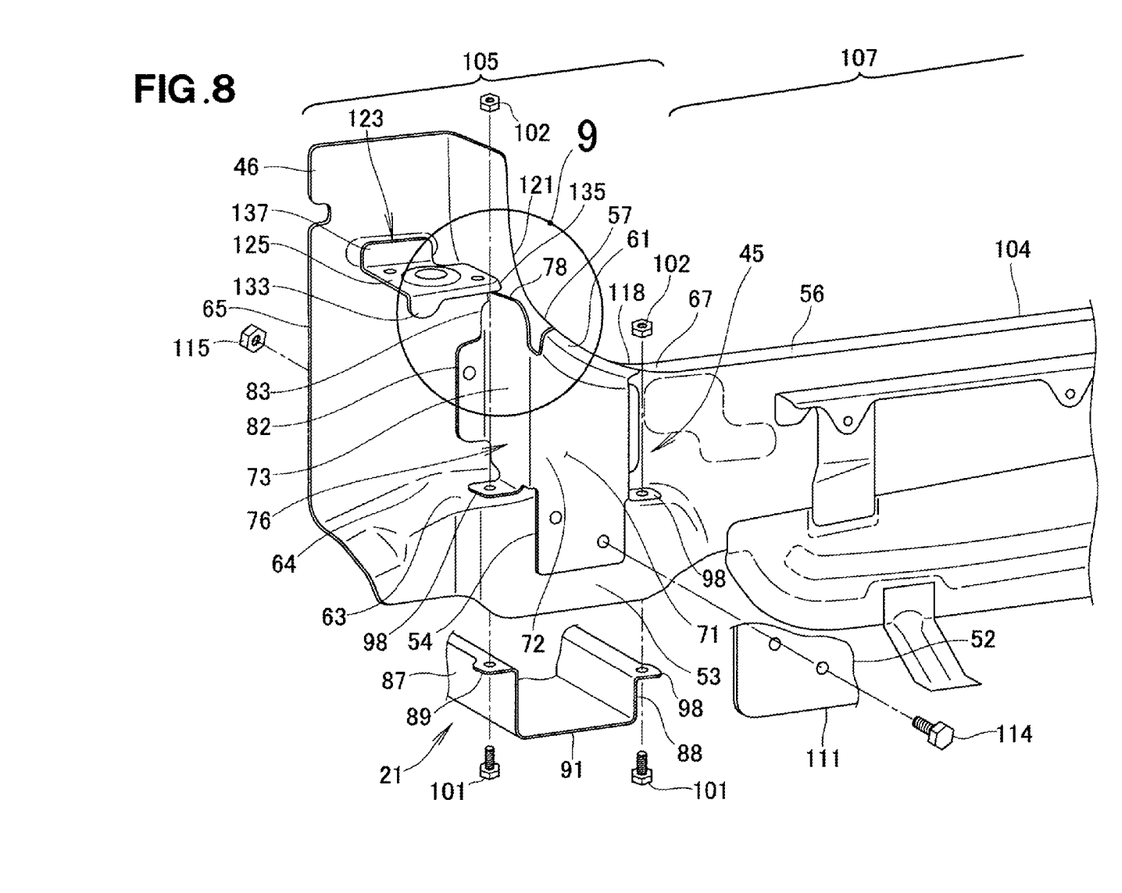
FIG. 8 is a perspective view showing relationship among the rear side frame, the inner rear panel member and the bulkhead.
Figure 9:
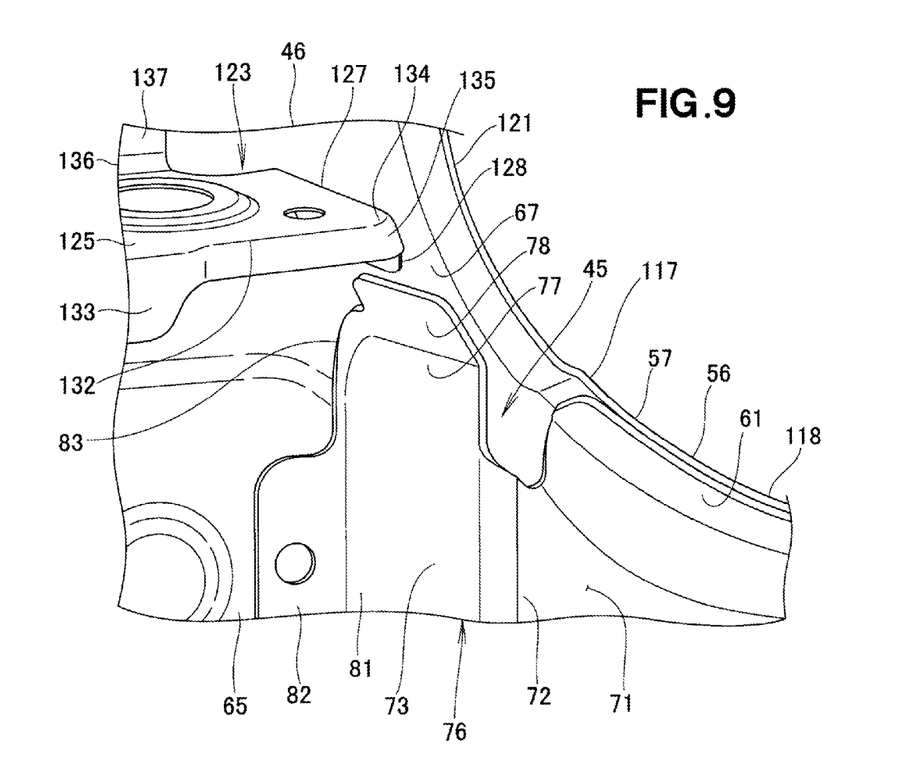
FIG. 9 is an enlarged view of a section encircled at 9 in FIG. 8.

Further, as shown in FIGS. 6 and 8, the inner extension 53 is joined to the flange plate 51 of the rear side frame 21 in superposed relation to the latter and the bulkhead extension 54 is joined to the inner extension 53 in superposed relation to the latter, so that the bulkhead 45 is joined to the edge 47 of the rear side frame 21.

Further, the rear-vehicle-body opening section 37 (FIG. 1) includes an opening-peripheral-edge layered flange 56 (FIGS. 3 and 4) extending in the vehicle width direction. As shown in FIG. 6, the opening-peripheral-edge layered flange 56 comprises an inner peripheral-edge flange 57 of the inner rear panel 46, and an outer peripheral-edge flange 58 of the outer rear panel 52 superposed on the inner peripheral-edge flange 57.

Further, the bulkhead 45 includes, on its upper portion, a bulkhead-peripheral-edge flange 61 sandwiched between and joined to the inner peripheral-edge flange 57 and the outer peripheral-edge flange 58.

The inner rear panel 46 includes: a lower plate section 63 superposed on the upper surface 43 (FIGS. 3 and 4) of the rear side frame 21; a front plate section 65 projecting upward integrally from the front edge 64 of the lower plate section 63;

an upper end section 67 extending integrally from the upper edge 66 of the front plate section 65 in opposed relation to the lower plate section 63; and the inner extension 53 extending integrally from the rear edge of the lower plate section 63.

Figure 11:
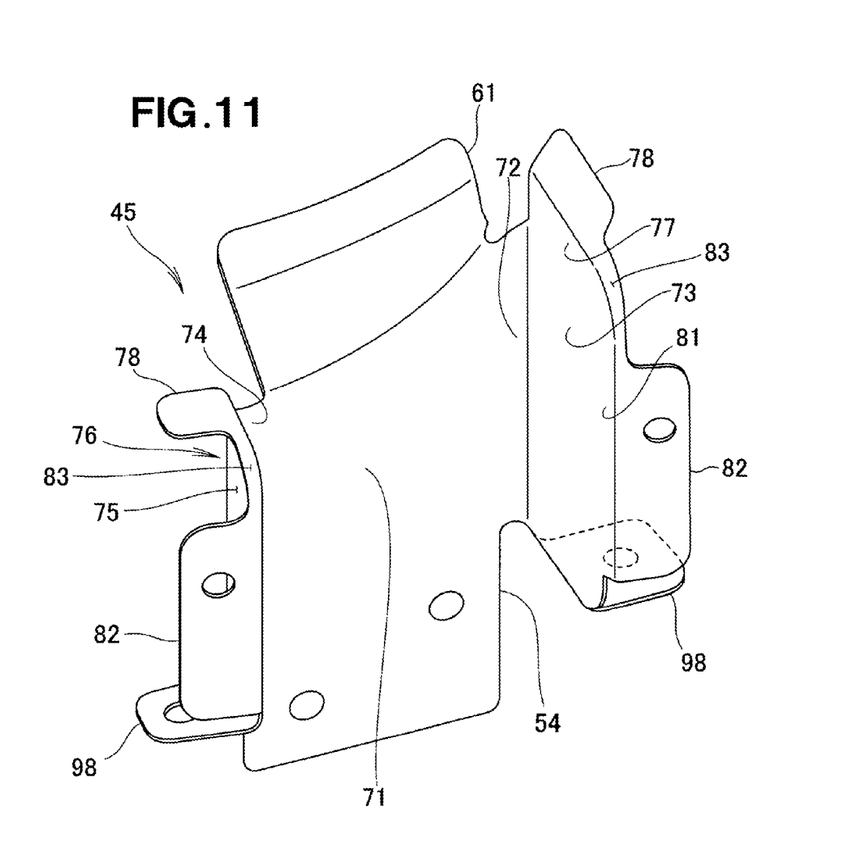
FIG. 11 is a perspective view of the bulkhead shown in FIG. 10.

As shown in FIGS. 10 and 11, the bulkhead 45 includes: a bulkhead body section 76 having a rear bulkhead wall 71 extending integrally from the bulkhead extension 54 upward beyond the rear side frame 21, one bulkhead side wall 73 extending integrally from one vertical edge of the rear bulkhead wall 71 toward the front plate section 65 and another bulkhead side wall 75 extending integrally from the other vertical edge 74 of the rear bulkhead wall 71 toward the front plate section 65 in opposed relation to the one bulkhead side wall 73; bulkhead-side-wall upper flanges 78 bent from respective upper portions 77 of the two bulkhead side walls 73 and 75 to be superposed on the upper end section 67 (FIG. 8); bulkhead-side-wall front flanges 82 bent from respective front portions 81 (FIGS. 5 and 11) of the two bulkhead side walls 73 and 75 to be superposed on the front plate section 65; and bulkhead-side-wall corner flanges 83 bent from the two bulkhead side walls 73 and 75 and extending from the bulkhead-side-wall front flanges 82 to the bulkhead-side-wall upper flanges 78.

Further, as shown in FIGS. 4 and 5, the rear vehicle body section 13 includes the rear side frames 21, the inner rear panel 46, the outer rear panel 52 and the bulkheads 45.

Each of the rear side frames 21, which has a U sectional shape defined with an outer wall section 87, an inner wall section 88 and a bottom section 91. The outer wall section 87 has an outer flange 93 formed on its upper end portion, and the inner wall section 88 has an inner flange 94 formed on its upper end portion. The lower plate section 63 of the inner rear panel 46 of the rear panel assembly 27 is mounted on portions of the outer and inner flanges 93 and 94 in superposed relation to the latter, and the rear floor panel 23 is mounted on the other portions of the outer and inner flanges 93 and 94.

The inner rear panel 46 and two bulkhead-side-wall lower flanges 98 of the bulkhead 45 are superposed, in the order mentioned, on flange fastening portions 96 formed on rear end regions of the flanges 93 and 94, and these superposed inner rear panel 46, bulkhead-side-wall lower flanges 98 and flange fastening portions 96 are fastened together by means of bolts 101 (FIG. 8) and nuts 102.

Further, as shown in FIG. 8, the inner rear panel 46 has a first inner-rear-panel mounting end section 105 formed on one end (left end) portion of an inner rear panel body 104 for mounting on the left rear side frame 21, and a second inner-rear-panel mounting end section 106 (FIG. 1) formed on another end (right end) portion of the inner rear panel body 104 for mounting on the right rear side frame 21. Reference numeral 107 indicates an intermediate portion of the inner rear panel 46.

The first inner-rear-panel mounting end section 105 includes the aforementioned inner extension 53, lower plate section 63, front plate section 65 and upper end section 67. The second inner-rear-panel mounting end section 106 is constructed and disposed substantially symmetrically with the first inner-rear-panel mounting end section 105.

Figure 7:
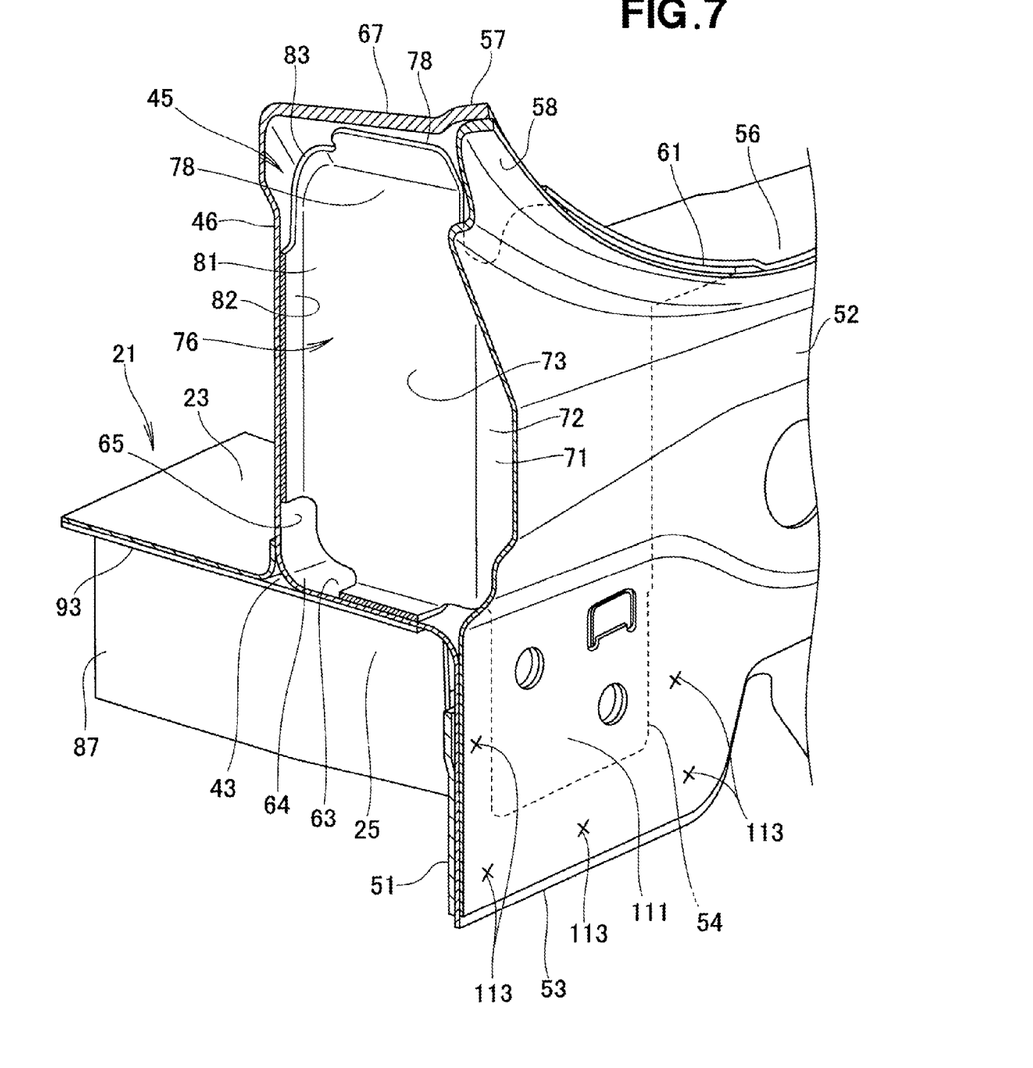
FIG. 7 is a perspective view showing a relationship among the bulkhead, an inner rear panel member and an outer rear panel member.

As shown in FIGS. 5(b) and 7, the outer rear panel 52 includes an outer extension 111 superposed on the inner extension 53 of the inner rear panel 46.

The outer extension 111, the inner extension 53 and the flange plate 51 are superposed on one another in the order mentioned and joined together at spot welding portions 113.

Further, as shown in FIG. 6, the inner extension 53, the bulkhead extension 54 and the outer extension 111 are superposed on one another (FIG. 6) and fastened together by means of a bolt 114 and a nut 115.

Further, as shown in FIG. 1, in the rear panel assembly 27, each of the bulkheads 45 is disposed within a start region of a corner section 117 of the assembly 27 to thereby partition the interior of the closed sectional shape extending in the vehicle width direction, and another bulkhead 123 is disposed within an end region of the corner section 117 to thereby partition the interior of a closed sectional shape extending in the vertical (up-down) direction of the vehicle 11.

Figure 12:
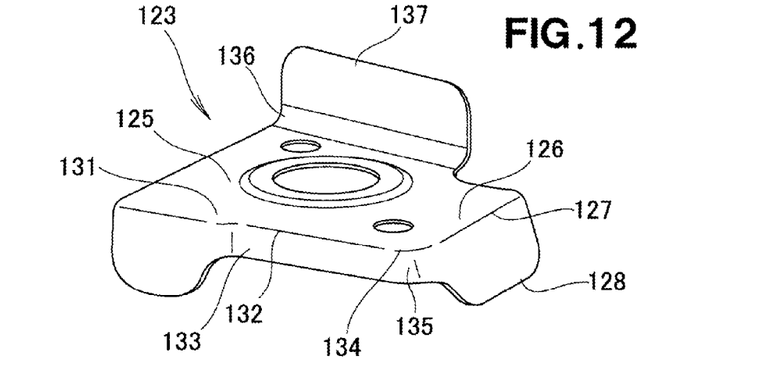
FIG. 12 is a perspective view of another bulkhead shown in FIG. 8.

Further, as shown in FIG. 12, the other bulkhead 123 includes a partition body 125 extending substantially horizontally to partition the interior of the closed sectional shape. An inner end portion 126, located closer to the interior of the vehicle 11, of the partition body 125 is bent downward to form a first ridge line portion 127 and a first flange 128, and a rear end portion 131, located closer to the rear of the vehicle 11, of the partition body 125 is bent downward to form a second ridge line portion 132 and a second flange 133. Further, a corner portion of the partition body 125 between the second flange 133 and the first flange 128 is bent downward to form a corner ridge line portion 134 and a corner flange 135. Further, a front end portion, located closer to the front of the vehicle 11, of the partition body 125 is bent upward to form a third ridge line portion 136 and a third flange 137.

Because the corner ridge line portion 134 and the corner flange 135 are formed on the other bulkhead 123 in the manner noted above, they can effectively disperse a load even in the corner portion of the rear panel assembly 27 similarly to the bulkhead-side-wall corner flanges 83 (FIG. 11), so that the other bulkhead 123 can have an increased strength.

Further, as shown in FIG. 2, the vehicle body 12 includes inner pillar members 141 of the quarter pillars 34, rear wheel houses 142 of the left and right side bodies 16, wheel house gussets 145, and upper stiffeners 146. Each of the rear wheel houses 142 includes an inner rear wheel house member 143 and an outer rear wheel house member 144.

The vehicle body 12 further includes a rear cross member 147, and damper mounting sections 153. The rear cross member 147 includes an upper floor cross member element 148 joined to the upper surface of the rear floor panel 23, and a lower rear floor cross member element 151 joined to the lower surface of the rear floor panel 23. Each of the damper mounting sections 153 is provided on an outer wall portion 87 of the rear side frame 21 and mounts thereon an upper portion of a damper of a not-shown rear suspension.

According to the above-described rear vehicle body section 13 in the instant embodiment, a load can be transmitted from the rear side frames 21 to the rear panel assembly 27 or from the rear panel assembly 27 to the rear side frames 21 via the bulkheads 45 provided within the closed-sectional portion 41 (FIG. 6), with the result that the rigidity and strength of the rear-vehicle-body opening section 37 (FIG. 1) can be increased.

More specifically, a damper thrusting-up load input to the damper mounting point (damper mounting section 153) in each of the rear side frames 21 as indicated by arrow b1 of FIG. 2 can be transmitted to be borne by the rear panel assembly 27, or a load input to the rear-vehicle-body opening section (tailgate opening section) 37 and likely to deform the tailgate opening section 37 can be transmitted to be borne by each of the rear side frames 21. Thus, the instant embodiment can increase the rigidity and strength against the damper thrusting-up load and the rigidity and strength of the tailgate opening section 37.

Further, when a load has been input to the rear bumper beam 31 (FIG. 1) at the time of a rear-end collision of the vehicle, the rear vehicle body section 13 in the instant embodiment can transmit the load to the rear side frames 21 via the impact absorbing members (extensions) 28. Such an arrangement can transmit the impact load to the rear side frames 21 with an increased efficiency, for example, as compared to a case where the impact load is transmitted via a rear end cross member fixed to the distal end surfaces of the rear end portions 25 and bulkheads fixed to the rear end cross member.

In addition, the rear vehicle body section 13 can disperse a vertical load, transmitted from the rear side frames 21, from the bulkhead-peripheral-edge flanges 61 (FIGS. 10 and 11) of the bulkheads 45 to the opening-peripheral-edge layered flanges 56 (FIGS. 6 and 7), with the result that the rear-vehicle-body opening section 37 can have an even further increased strength against a load applied from the rear side frames 21.

INDUSTRIAL APPLICABILITY

The vehicle body rear structure of the present invention is well suited for application to automotive vehicles.
Legend:
11 . . . vehicle, 12 . . . vehicle body, 13 . . . rear vehicle body section, 21 . . . rear side frame, 25 . . . rear end portion of the rear side frame, 27 . . . rear panel assembly, 28 . . . impact absorbing member, 31 . . . rear bumper beam, 37 . . . rear-vehicle-body opening section, 41 . . . closed-sectional portion, 43 . . . upper surface of the rear side frame, 45 . . . bulkhead, 46 . . . inner rear panel, 47 . . . edge of the rear end portion, 51 . . . flange plate, 52 . . . outer rear panel, 53 . . . inner extension, 54 . . . bulkhead extension, 56 . . . opening-peripheral-edge layered flange, 57 . . . inner peripheral-edge flange of the inner rear panel, 58 . . . outer peripheral-edge flange of the outer rear panel, 61 . . . bulkhead-peripheral-edge flange of the bulkhead, 63 . . . lower plate section, 65 . . . front plate section, 67 . . . upper end section, 71 . . . rear bulkhead wall, 72 . . . one vertical edge, 73 . . . one bulkhead side wall, 74 . . . other vertical edge, 75 . . . other bulkhead side wall, 76 . . . bulkhead body section, 78 . . . bulkhead-side-wall upper flange, 82 . . . bulkhead-side-wall front flange, 83 . . . bulkhead-side-wall corner flange

The invention claimed is:

1. A vehicle body rear structure comprising:
   left and right side frames extending in a front-rear direction of a vehicle body; and
   a rear panel assembly defining a closed-sectional portion extending in a vehicle width direction to intersect with the left and right side frames, the rear panel assembly being joined to respective rear end portions of the left and right rear side frames to thereby define a lower part of a rear-vehicle-body opening section,
   the rear panel assembly including bulkheads each disposed on an upper surface of a corresponding one of the left and right rear side frames and within an interior of the closed-sectional portion and partitioning the interior of the closed-sectional portion with opposite surfaces of the bulkhead oriented in the vehicle width direction, the bulkhead being disposed in vertically superposed relation to the corresponding one of the left and right rear side frames;
   wherein each of the left and right rear side frames has a flange plate provided on an edge of the rear end portion and has opposite surfaces orientated in the front-rear direction,
   the rear panel assembly includes an inner rear panel and an outer rear panel, the inner rear panel having an inner extension reaching the edge of the rear end portion and having opposite surfaces oriented in the front-rear direction of the vehicle body,
   each of the bulkheads having a bulkhead extension extending along the inner extension and having opposite surfaces oriented in the front-rear direction, the bulkhead being joined to the edge of the corresponding rear side frame rear end portion by the inner extension being joined to the flange plate in superposed relation to the flange plate and the bulkhead extension being joined to the inner extension in superposed relation to the inner extension.

2. The vehicle body rear structure according to claim 1, further comprising a rear bumper beam supported by the rear end portions of the left and right rear side frames and extending in the vehicle width direction, and wherein the rear bumper beam is joined to the rear end portions of the left and right rear side frames via impact absorbing members.

3. The vehicle body rear structure according to claim 1, wherein the rear-vehicle-body opening section has an opening-peripheral-edge layered flange extending in the vehicle width direction, the opening-peripheral-edge layered flange comprises an inner peripheral-edge flange of the inner rear panel and an outer peripheral-edge flange of the outer rear panel superposed on the inner peripheral-edge flange, and
   wherein the bulkhead includes, on an upper portion thereof, a bulkhead-peripheral-edge flange sandwiched between and joined to the inner peripheral-edge flange and the outer peripheral-edge flange.

4. The vehicle body rear structure according to claim 1, wherein the inner rear panel includes: a lower plate section superposed on the upper surface of the rear side frame; a front plate section projecting upward integrally from a front edge of the lower plate section; an upper end section extending integrally from the upper edge of the front plate section in opposed relation to the lower plate section; and the inner extension extending integrally from a rear edge of the lower plate section, and
   wherein each of the bulkheads includes: a bulkhead body section having a rear bulkhead wall extending integrally from the bulkhead extension upward beyond the rear side frame, one bulkhead side wall extending integrally from one vertical edge of the rear bulkhead wall toward the front plate section and another bulkhead side wall extending integrally from another vertical edge of the rear bulkhead wall toward the front plate section; bulkhead-side-wall upper flanges bent from respective upper portions of the one and other bulkhead side walls to be superposed on the upper end section of the inner rear panel; bulkhead-side-wall front flanges bent from respective front portions of the one and other bulkhead side walls to be superposed on the front plate section; and bulkhead-side-wall corner flanges bent from the one and other bulkhead side walls to extend from the bulkhead-side-wall front flanges to the bulkhead-side-wall upper flanges.

5. The vehicle body rear structure according to claim 1, wherein each of the bulkheads includes a bulkhead body section having:
   a rear bulkhead wall extending upward beyond the rear side frame and having opposite surfaces oriented in the front-rear direction;
   one bulkhead side wall extending integrally from one vertical edge of the rear bulkhead wall and toward the front plate section; and another bulkhead side wall extending integrally from another vertical edge of the rear bulkhead wall and toward the front plate section in opposed relation to the one bulkhead side wall.

6. The vehicle body rear structure according to claim 5, wherein the rear side frame has a U sectional shape defined with an outer wall section, an inner wall section and a bottom wall section, the outer wall section having an outer flange formed on an upper end portion thereof, the inner wall section having an inner flange formed on an upper end portion thereof, and wherein the bulkhead has bulkhead-side-wall lower flanges bent from respective lower portions of the one and other bulkhead side walls and superposed on the outer flange and the inner flange.

* * * * *